April 17, 1962

A. W. GUILL 3,029,466

LIQUID PHASE PELLETER

Filed March 9, 1956

INVENTOR
A. W. GUILL
BY
ATTORNEY

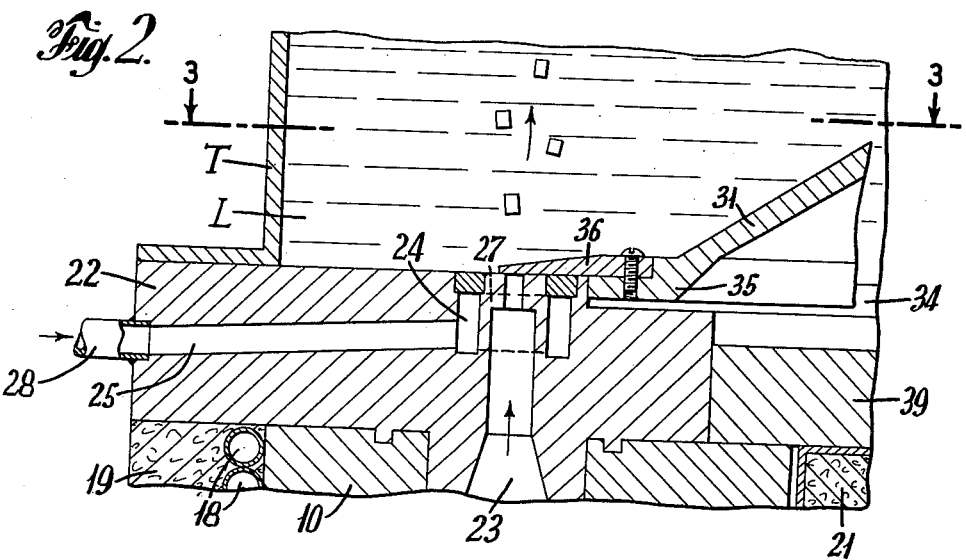
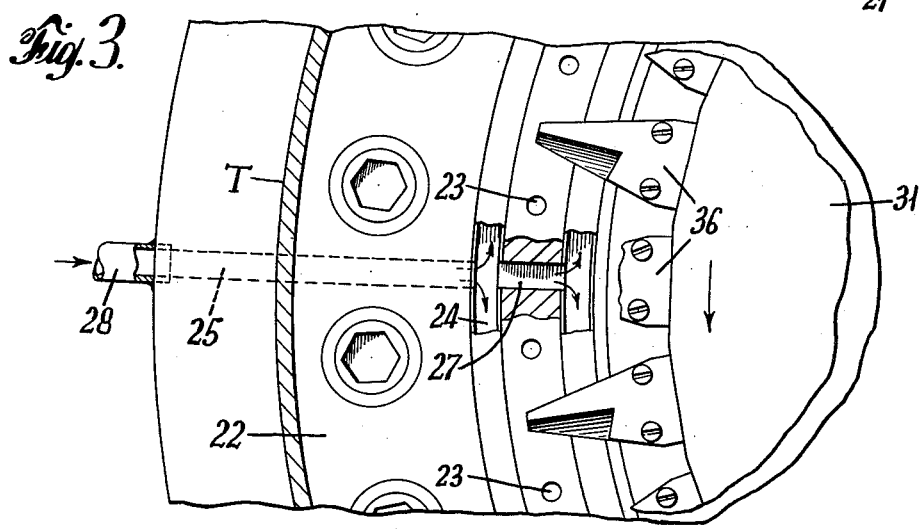
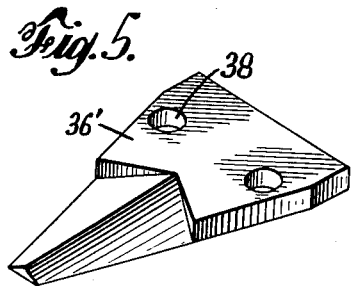
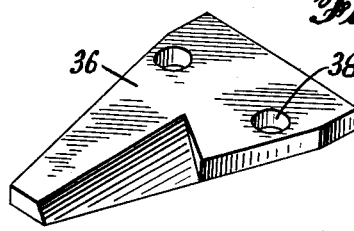
INVENTOR
A. W. GUILL
BY
ATTORNEY 3,029,466
LIQUID PHASE PELLETER
A. W. Guill, Weybridge, England, assignor to Union Carbide Corporation, a corporation of New York
Filed Mar. 9, 1956, Ser. No. 570,536
4 Claims. (Cl. 18—1)

This invention relates to improved pelleter apparatus of the liquid phase type for producing thermoplastic resin pellets.

Liquid phase pelleters are commonly used for extruding and cutting discrete particles or pellets from a molten thermoplastic resin such as a polyethylene resin. Such devices are found especially useful in systems wherein the plastic material is readily available in the molten phase from a source of supply such as the outlet of a resin extruder.

The liquid phase pelleters heretofore commonly used in the customary processes for forming thermoplastic resin pellets and the like presented many difficulties and disadvantages from a mechanical or economical standpoint, or both. For example, resin pellets are often formed by extruding a resin through a plurality of extrusion orifices and by shearing the resin with a fly knife rotated in front of the orifices to periodically cut the resin into short cylindrical pieces or pellets. When employing such apparatus it has been found necessary to limit the number of extrusion orifices to allow the formed pellets to clear each other rather than agglomerate into useless chunks of resin which often adhere to the rotating cutting blades. In so overcoming this disadvantage, the capacity of the pelleters to produce a maximum quantity of useable pellets is considerably lessened.

Another disadvantage in producing pellets in accordance with heretofore common practice is that the devices employed produced non-uniformly shaped pellets characterized by imperfections in the form of adhering solidified chunks and strands. These imperfections inherent in the formed pellets reduced the value of the resin by decreasing the overall bulk density of the material processed. The overall bulk density of the resin pellets is an important consideration when the pellets are prepared for storage, shipment or use in subsequent processes.

Therefore an object of this invention is the provision of a novel pelleter which will be especially rugged in construction and efficient in operation for producing in accordance with the process of this invention thermoplastic resin pellets of uniform size and shape and of high bulk densities.

The above and other objects are accomplished by the novel features of the present invention which will become apparent from the following description, having reference to the annexed drawings wherein:

FIG. 2 is an enlarged cut-away sectional view showing in detail the extrusion orifice and cutting knife embodiments shown in FIG. 1;

FIG. 3 is a partial sectional view taken along the line 3—3 of FIG. 2;

FIG. 4 is a perspective view of one of the preferred cutting knives shown in FIGS. 1 to 3, employed when the cutting knives are made to rotate about the axis of the pelleter;

FIG. 5 is a perspective view of one of the cutting knives shown in FIGS. 1 to 3, employed when the cutting knives are made to oscillate across the orifice openings.

Like reference numerals indicate like parts throughout the several views of the drawings.

Figure 1:
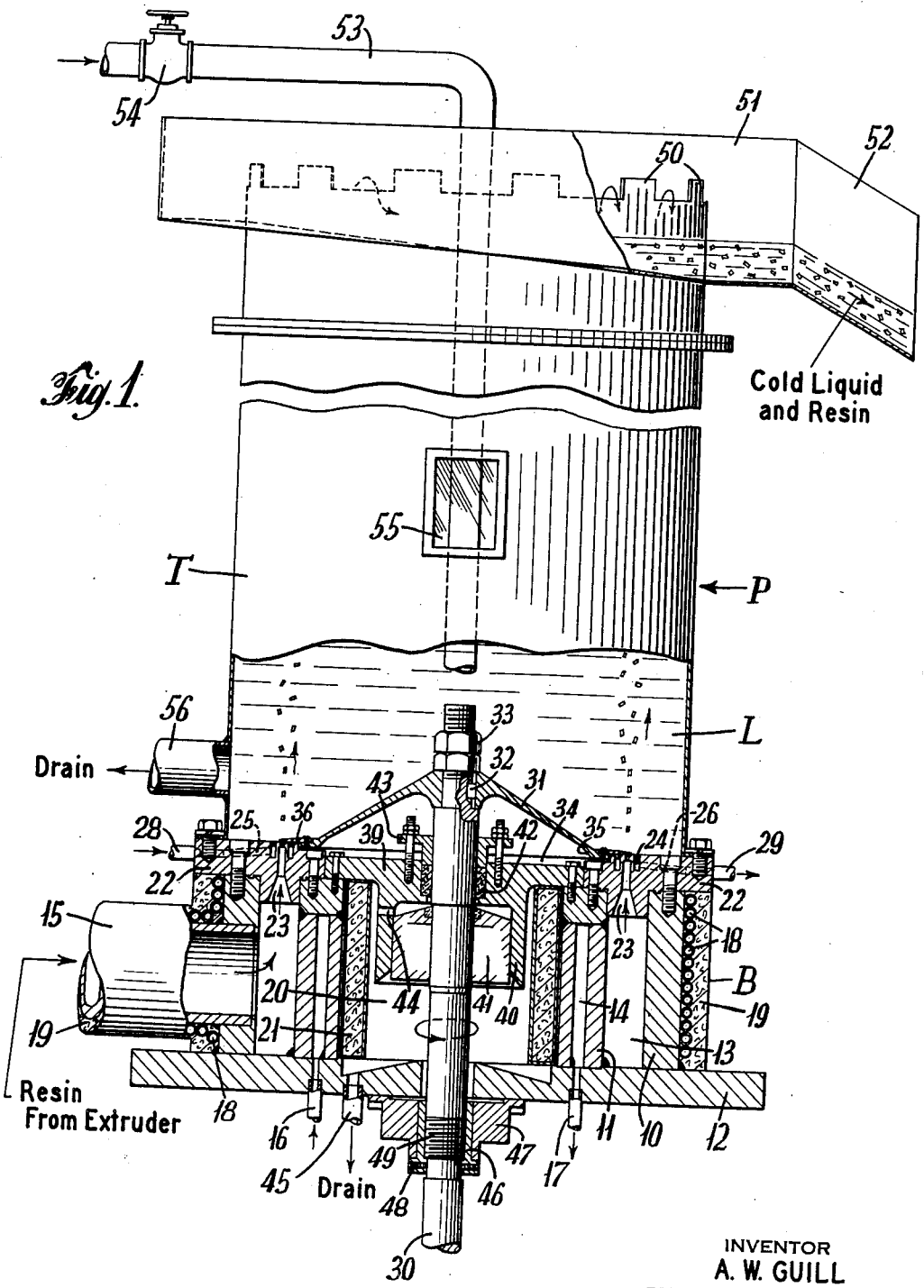
FIG. 1 is an elevational view, sectional in part, of the pelleter embodying the invention.

The process for extruding and cutting a molten thermoplastic resin into the form of discrete particles or pellets carried out in the novel apparatus comprises directing a flow of molten thermoplastic resin through a heated zone and towards a body of cold liquid, heating and extruding a plurality of molten thermoplastic resin strands directly into the body of cold liquid, and cutting the extruded molten strands within the body of cold liquid into the form of pellets at about the congealing point of the resin. The formed pellets are transported upwardly through the body of cold liquid to a portion of the cold liquid remote from the area of extrusion and cutting by the difference in relative density between the cold liquid and thermoplastic resin. The pellets are then directed to a separating and drying device. The cold liquid additionally acts to force the pellets from the cutting knives of the pelleting apparatus by the drag action of the cutting knives passing through the body of cold liquid and also acts to effect the immediate congealing of the pellet surfaces after they are cut to prevent agglomeration of the pellets into a useless mass.

For performing the process described briefly above, there is provided a novel liquid phase pelleter P comprising an elongated cylindrical tank T leak-resistantly sealed to and extending co-axially upward from a cylindrical pelleter body B. The pelleter body B is adapted to be mounted to a housing support (not shown) of a suitable mechanism for driving the pelleter when in operation. A cold liquid L, that is a liquid maintained at a temperature considerably below the congealing temperature of the thermoplastic resin, is supplied to and retained within the tank T above the pelleter body B.

More specifically, the pelleter body B comprises an outer cylindrical wall 10 and an inner cylindrical wall 11 co-axially mounted to and vertically above a circular base plate 12 which may be mounted to a housing-support of the above-mentioned driving mechanism. Members 10 and 11, being co-axially mounted to base plate 12, form the annular resin chamber 13 providing a free passage between the outer wall 10 and inner wall 11 for the flow of thermoplastic resin. Also formed integrally with base plate 12 by the partitioning of inner wall 11 is the annular heating cavity 14 which provides a means for heating the flow of resin through the annular resin chamber 13.

A thermoplastic resin, as for example a polyethylene resin, is introduced into the pelleter body B through a resin inlet conduit 15 extending through outer wall 10 and terminating at its inner end within the resin chamber 13. Inlet conduit 15 to supply annular resin chamber 13 with a continuous flow of thermoplastic resin may communicate at its outer end with an outlet of a resin extruder which may be, for example, of the screw stuffer type or other conventional design.

The pressures and temperatures at which the resin is received within chamber 13 are governed by the particular properties of the resin to be processed. For example, when pelleting a polyethylene resin the pressure at which the resin is processed may be from 200 to about 3000 pounds per square inch (gauge) and the temperature maintained within chamber 13 between about 125° C. and 260° C.

A heating fluid, such as steam, is injected into and circulated through the annular heating cavity 14 by way of the inlet 16 and the outlet 17 in the base plate 12. Heating of the resin within annular chamber 13 is important since the resin must be maintained substantially in the molten phase throughout the extrusion portion of the pelleting process. Additionally, for the purpose of preventing solidification of the resin within chamber 13 and the inlet conduit 15 which may be caused by the cooler atmosphere surrounding the pelleter, a heating fluid, for example steam, is passed through an outer heating means such as the helical heating coils 18 which are wound about the outer surface of outer wall 10 including the exposed portion of resin inlet conduit 15. However, other heating means such as a heating chamber in outer wall 10 similar to heating cavity 14 will serve equally as well to prevent the solidification of the resin in chamber 13.

The loss of heat by convection and radiation to the surrounding atmosphere from helical heating coils 18 is prevented by circumferentially jacketing a thermal insulation 19 about outer wall 10 and resin inlet conduit 15. Also, inner wall 11 to insure against additional heat leakage to the innermost portion 20 of the pelleter body B is provided with thermal insulation 21. Preferably, thermal insulation 21 is of the metal clad type, which will be resistant to the adsorption of cold liquid L in the event of leakage from upper tank T.

An annular resin die plate 22 carrying an annular plurality of equi-angularly positioned extrusion orifices 23 is mounted above outer wall 10 and inner wall 11 so as to position the orifices 23 above the resin chamber 13. Orifices 23, as shown, may be composed of straight countersunk holes or other like form which will facilitate extrusion of the thermoplastic resin. Molten thermoplastic resin may then be received by and extruded through the plurality of orifices 23 into the cold liquid L. Also provided in die plate 22 are the annular dual heating conduits 24 adjacent to the plurality of orifices 23 for supplying heat to the resin being extruded.

Heating fluid, such as steam, is injected within and circulated through annular dual heating conduits 24. The injection and circulation of heating fluid through conduits 24 may be accomplished by any number of suitable means such as by way of the inlet fluid passage 25 and the outlet fluid passage 26. The passages 25 and 26 as shown in FIG. 3 terminate within the dual conduits 24 at the opening of an inter-communicating chamber 27 which is positioned between dual heating conduits 24. An even distribution of heat is thus provided to the resin in all portions of the plurality of extrusion orifices 23. Inlet fluid passage 25 and outlet fluid passage 26 are respectively provided with injection inlet 28 and discharge outlet 29 for maintaining the circulated flow of heating fluid.

Heating the flow of resin through extrusion orifices 23 is important in order to prevent the formation of chunks or balls of resin within orifices 23 caused by the cooling effect of the cold liquid L above the extruding resin. Further, heating of the extruding resin is advantageous since a high temperature differential between the resin and cold liquid L is desired for cutting or shearing the resin at about its congealing point. This feature, namely the function of the heating conduits 24 to heat the extruded resin prior to cutting, makes it possible to employ a relatively calm body of cold liquid within the extrusion and cutting zone of the pelleter for freeing the pellets from the cutting knives and for rapidly solidifying the surface of the formed pellets upon being cut to prevent agglomeration and massing together into useless shapes.

A drive shaft 30 is co-axially secured within the pelleter body B extending upwardly through the innermost portion 20 and through the die plate 22 to terminate at its upper end within the elongated cylindrical tank T. The lower end of the shaft 30 communicates with a connection assembly (not shown) employed with the driving mechanism.

A conical cutter head 31 communicates with the upper end of the drive shaft 30 and is secured thereto by Woodruff key 32 and lock nut 33, positioning the entire cutter head unit within the cold liquid L. A circular recess 34 is provided in die plate 22 so that the flange 35 of the cutter head 31 may move freely above the die plate 22.

The cutter head 31 may be made to either rotate or oscillate by the drive shaft 30 through a suitable connection assembly positioned below the pelleter body B. However, a rotational cutter head motion has been found preferable. The number of cutting knives 36 employed when rotating the cutter head 31 is dependent on the speed of rotation and the pelleter capacity desired; whereas an equal number of extrusion orifices and cutting knives are provided when the cutter head 31 is made to oscillate. Two cutting knives 36 mounted to the cutter head 31 at an interval of 180 degrees have been found suitable when rotating the cutter head 31. However, cutter heads carrying 4, 6 and 8 equi-angularly mounted cutting knives 36 have been found equally as suitable at slower rotational speeds.

As shown in FIG. 4, a single edge cutting knife 36 is employed when rotating the cutter head 31. FIG. 5 illustrates the double edge cutting knife 36' which is mounted to cutter head 31 when the oscillatory motion is utilized to shear the extruded resin strands from the die plate 22. Holes 38 are provided in the cutting knives 36 and 36' for rigidly bolting the cutting knives to the flange 35 of the cutter head 31.

Drive shaft 30 is secured in position by circular shaft support housing 39. Housing 39 positions the sleeve 40 to extend downwardly and adjacent to, but not in contact with, the thermal insulation 21. Within the sleeve 40 is fitted a top drive shaft bearing 41 for securing drive shaft 30 within support housing 39, thereby insuring against any undesirable vibrational or radial shaft motion.

Replaceable annular shaft seal ring 42 is fitted within shaft support housing 39 and packed leak-resistantly against the surface of shaft 30 by removable shaft seal follower 43, bolted down in position to the housing 39. Seal ring 42 serves to insure against cold liquid leakage from tank T into the drive shaft bearing assembly and into the innermost portions 20 of the pelleter body B. In the event of failure of shaft seal ring 42, the sleeve 40 is provided with outlet drain 44 which carries the leakage-liquid from the bearing 41 to the drain 45 in base plate 12.

A removable thrust nut 46 secured to shaft 30 extends inwardly through and in rotational contact with a bottom drive shaft combination thrust and radial bearing 47, mounted to the lower face of the base plate 12. Thrust nut 46 serves to firmly position shaft 30 in the lower portion of the pelleter body B and to prevent undesirable radial shaft motion. Set screws 48 lock tightly against the shaft 30 and prevent rotation of the thrust nut 46 about the threaded portion 49 of the draft shaft 30.

The cutting knives 36 are vertically adjusted by the thrust nut 46 to lightly contact the surface of die plate 22. The amount of resin to be extruded through orifices 23 into resin strands prior to cutting is determined in rotating motion of cutter head 31 by the number of cutting knives 36 employed and by the speed of rotation and in oscillatory motion by the angle of oscillation.

When a molten thermoplastic resin is pelletized in accordance with the hereindescribed process, the molten resin expands as it emerges from the extrusion orifice 23 into the body of cold liquid L. The degree of expansion varies with the temperature of the resin extruded. Spherical pellets are advantageously shaped by the action of the expanding resin and the extrusion of additional resin into the center of the pellet as the outer surface exposed to the cold liquid begins to congeal. The cutting knives 36 shear the pellets from the die plate 22 which pass into the cold liquid L to be transported upwardly in the tank T. The shrinkage of the resin pellet upon congealing forms indentations on the surface of the pellets which are useful for preventing rolling of the pellets when stored or used in subsequent processes.

The upper peripheral edge of tank T carries a plurality of overflow weirs 50. Weirs 50 serve the purpose of uniformly dispersing an overflow of cold liquid L and resin pellets into a collector ring 51 secured to the tank T below weirs 50. Collector ring 51 inclinedly terminates in an outlet spout 52 secured to ring 51, as by welding or soldering. Cold liquid and resin pellets flow from the outlet spout 52 to some suitable device for separating the pellets from the discharged liquid and for drying the pellets prior to storage or subsequent use. A vibratory conveyor or a centrifuge equipped with a drying mechanism have been found suitable for this purpose.

Cold liquid L is supplied to tank T by supply conduit 53 extending horizontally over and downwardly through the tank T terminating at its outlet end over the cutter head 31. The inlet flow rate of liquid from conduit 53 is regulated by means of control valve 54. Plexiglass sighting means 55 may be positioned on the wall of tank T to afford visual observation of the extrusion and cutting elements of the pelleter. A drain outlet 56 is also provided in the tank T to remove cold liquid in the event of shutdown.

To effect an oscillatory motion of cutter head 31, a connecting rod unit (not shown) is made to communicate between the lower portion of the shaft 30 and the lower driving mechanism. The connecting rod unit is preferably designed to oscillate the cutter head 31 through an oscillatory angle equal to that formed by two adjacent and equi-angularly spaced orifice 23 and the axis of the drive shaft 30. The thermoplastic resin is continously extruded except during the period of time that the cutting knives 36′ pass and repass across the orifice openings. The double edge cutting knives 36′, as shown in FIG. 5, serve the purpose of alternately shearing the resin strands when the cutting knives reverse from their extremities of movement and repass over the orifices 23.

The reversing action of the cutting knives 36′ in oscillatory motion of cutter heads 31 propel the sheared resin from the cutting knives 36′ into the body of cold liquid L above die plate 22. This propelling action in oscillatory motion adds to the drag action of knives 36′ passing through the cold liquid L in preventing undue and deleterious agglomeration of the pellets in the extrusion and cutting area of the pelleter.

The cutter head 31 may be made to rotate by employing a suitable connection assembly communicating between the drive shaft 30 and the lower driving mechanism. Any mechanism which will impart a high rotational velocity to the resin cutting knives 36 may be employed to drive the cutter head unit. A quadric chain mechanism powered by a variable speed motor has been found suitable for driving the shaft and cutter head assemblies.

An essential property of the cold liquid L is that it possess a relative density which is greater than the density of the thermoplastic resin processed. This is for the reason that the difference in specific gravity between the formed resin pellets and cold liquid serves to transport the pellets upwardly through the tank T to the overflow maintained over the weirs 50. A second and very important property of the cold liquid L is that it be inert to the thermoplastic resin. It is important that the cold liquid not react chemically with the resin pellets to form pits and uneven surface imperfections particularly when the pellets are exposed and dried at elevated temperatures.

When a polyethylene resin is pelletized in accordance with the herein-described process, a water bath is suitable to perform the function of the cold liquid. However, other solutions may be employed for pelleting many commerically produced thermoplastic resins in accordance with the herein-described process. Water-glycol and saline water solutions have been found suitable in many instances.

According to the present process, the extruded strands of thermoplastic resin are cut at about the congealing point of the resin in order to prevent agglomeration of the formed pellets and adherence to the cutting knives of the pelleting apparatus. To maintain this requirement, the temperature of the cold liquid L or more specifically the temperature differential between the resin and cold liquid L should be maintained wtihin a certain range which will cause congealing of the resin at about the cutting stage of the process. This may be accomplished by utilizing and adjusting the heat from heating conduits 24 to heat the liquid above the die plate 22. However, heating means associated with tank T can be employed equally as well for this purpose. A temperature differential of between about 80° C. and about 200° C. served to maintain the congealing point of the resin at about the cutting stage of the process for pelleting a number of commercially produced thermoplastic resins. The resin die orifice temperature is preferably maintained within the range of from about 110° C. to about 160° C. when pelleting many commercial resins such as polyethylene resin.

Normally, when pellets are produced by the heretofore customary processes, pellet surface imperfections in the form of chunks and strands are encountered. These imperfections detract considerably from the use and value of the resin, particularly by decreasing the overall bulk density of the resin. Pellet surface imperfections are chiefly caused by adherence of molten resin to the cutting blades of the pelleting apparatus when the sheared pellets are scraped free from the blades or allowed to fall free by gravity. Therefore a particularly important advantage of the present process and apparatus is the production of resin pellets free from these undesirable imperfections. The pelleting of resin materials within a body of cold liquid permits the resin to be sheared cleanly into the form of pellets with little if any adherence of resin to the cutting knives.

Another and very important advantage is the ease with which the sheared pellets are freed from the cutting blades of the pelleting apparatus. The drag action of the swiftly moving cutting knives 36 through the viscous cold liquid L enables the formed pellets to be freed of the cutting blades and propelled into the region immediately above the die plate 22. Additionally, since pellet adherence to the cutting knives has been substantially eliminated, the number of extrusion orifices employed in the present pelleting apparatus may be substantially increased and the spacing between adjacent orifices accordingly decreased. This advantage greatly improves the overall capacity of pelleters to produce a maximum quantity of usable pellets.

Still another advantage is the retention of a part of the heat of fusion within the formed pellets providing a utilization of heat when drying the pellets or in subsequent extrusion and molding processes. This desirable property of the resin pellets formed in accordance with the herein-described process is made possible since only the surface of each pellet has been solidified with the inner portion of the pellets remaining in the molten phase, thereby retaining a part of the heat of fusion.

A liquid phase pelleter of the twpe shown in the drawings was employed for pelleting a polyethylene resin. The pelleter was constructed with a total of 36 extrusion orifices. Each extrusion orifice had cross-sectional diameter openings of about 0.15 inch and were spaced at approximately 9 orifice diameters. The resin was introduced into the resin chamber at an inlet pressure of about 1200 pounds per square inch gage and at a temperature of about 256° C. The resin was extruded at a die orifice temperature of about 145° C. The cold liquid employed was water which was continuously fed into the cold liquid tank at a temperature of approximately 80° C. The capacity of the pelleter was estimated at about 12,000 pellets per pound of resin and approximately 42 pounds of resin were produced per hour per orifice. The pellets produced had an overall bulk density of about 34.5 pounds.

It will be understood that various changes may be made in the construction set forth above without departing from the spirit and scope of the process and apparatus of this invention.

What is claimed is:

1. A pelleter of the liquid phase type for producing substantially uniformly sized pellets of resin comprising, in combination, an annular heated chamber for receiving a molten thermoplastic resin, a die plate associated with one end of said chamber, a plurality of extrusion orifices in said die plate arranged and formed in a row and communicating with said chamber, heating conduit means in said die plate comprising two flanking passageways one on either side of equally distant from and parallel to the row of extrusion orifices and immediately adjacent to such orifices so that the resin passing through each extrusion orifice is substantially uniformly heated by a heating fluid in the passageways flanking such orifice, a drive shaft extending into said pelleter, a plurality of cutting knives mounted to the peripheral edge of said cutter head, said cutting knives being adapted to pass over and in contact with the surface of said die plate and cut said resin extruded from the orifices, and a tank adapted to retain a body of liquid over said orifices and around said cutting knives.

2. A pelleter according to claim 1 wherein an equal number of cutting knives and extrusion orifices are provided, and wherein said cutting knives are constructed and arranged to oscillate over said orifices to aid in propelling the formed resin pellets free from said knives.

3. A pelleter according to claim 1 wherein at least two cutting knives are provided and adapted to rotate within the tank over and in contact with the surface of the die plate to cut resin extruded from the orifices.

4. A pelleter of the liquid phase type for producing substantially uniformly sized pellets of thermoplastic resin comprising in combination, an annular heated chamber for receiving a molten thermoplastic resin, a circular die plate associated with one end of said chamber, a plurality of extrusion orifices in said die plate arranged and formed in a circular row concentric to the center of the die plate and communicating with said chamber, heating conduit means in said die plate comprising two flanking circular passageways one on either side of the circular row of extrusion orifices and equally distant therefrom, the heating passageways being concentrically located around the center of the die plate and immediately adjacent to such orifices so that the resin passing through each extrusion orifice is substantially uniformly heated by a hot fluid in the circular passageways, a drive shaft extending into said pelleter and having an axis of rotation passing through the center of said circular die plate, a cutter head connected to an end of said drive shaft on the die plate side remote from said annular heated chamber, a plurality of cutting knives mounted to the peripheral edge of said cutter head and adapted to rotate in sliding contact on the remote side of the die plate and cut the resin extruded from the orifices into pellets, and a tank adapted to retain a body of cold liquid, said tank being mounted to the remote die plate side for submerging the rotating cutting knives and the circular row of extrusion orifices in such cold liquid thereby allowing removal of the extruded and cut resin pellets away from the die plate and knives by means of the cold liquid so as to form substantially uniformly sized pellets therein.

References Cited in the file of this patent

UNITED STATES PATENTS

| | | |
|---|---|---|
| 231,489 | Holtz | Aug. 24, 1880 |
| 2,401,236 | Fielitz | May 28, 1946 |
| 2,411,971 | MacMillin et al. | Dec. 3, 1946 |
| 2,436,201 | Cole | Feb. 17, 1948 |
| 2,570,423 | Batchelder et al. | Oct. 9, 1951 |
| 2,706,365 | Stalego | Apr. 19, 1955 |
| 2,850,764 | Evans et al. | Sept. 9, 1958 |
| 2,918,701 | Hull et al. | Dec. 29, 1959 |

FOREIGN PATENTS

| | | |
|---|---|---|
| 531,561 | Belgium | Mar. 1, 1955 |
| 1,115,424 | France | Jan. 3, 1956 |
| 638,992 | Great Britain | June 21, 1950 |